United States Patent

Watanabe et al.

[11] Patent Number: 5,984,545
[45] Date of Patent: Nov. 16, 1999

[54] CHARACTER INFORMATION PROCESSOR

[75] Inventors: Kenji Watanabe; Tomoyuki Shimmura; Takanobu Kameda; Chieko Aida, all of Tokyo; Hiroyasu Kurashina; Takeshi Hosokawa, both of Suwa, all of Japan

[73] Assignees: King Jim Co., Ltd.; Seiko Epson Corporation, both of Japan

[21] Appl. No.: 08/966,748

[22] Filed: Nov. 10, 1997

[30] Foreign Application Priority Data

Nov. 15, 1996 [JP] Japan .................................. 8-304447

[51] Int. Cl.$^6$ ........................................................ B41J 5/30
[52] U.S. Cl. .............................. 400/61; 400/61; 400/109; 395/110; 395/171
[58] Field of Search ................................ 400/485, 83, 61, 400/62, 70, 74, 109; 395/110, 171

[56] References Cited

U.S. PATENT DOCUMENTS

| 5,664,896 | 9/1997 | Blumberg ................................. 400/485 |
| 5,680,520 | 10/1997 | Watanabe et al. ....................... 395/110 |

FOREIGN PATENT DOCUMENTS

| 2116963 | 5/1990 | Japan . |
| 4259063 | 9/1992 | Japan . |
| 528156 | 2/1993 | Japan . |

*Primary Examiner*—John Hilten
*Attorney, Agent, or Firm*—Lorusso & Loud

[57] ABSTRACT

The present invention relates to a character information processor having a function by which the user can obtain a character to be inputted by inputting a code corresponding to the character.

The character information processor of the present invention includes: code input means through which the code is inputted; and a plurality of code-character conversion tables which are associated with different code systems and each of which contains relationships between codes and their corresponding characters under the code system. Also, the processor includes eligible character retrieving means for retrieving each of the plurality of code-character conversion tables to find out a character corresponding to the code inputted through said code input means so as to output the character thus found as an eligible character with respect to each of the plurality of code-character conversion tables; display means for displaying, on a display screen, one or more eligible characters supplied from the eligible character retrieving means; and selecting means for selecting one character as a desired character out of the one or more eligible characters thus displayed.

3 Claims, 5 Drawing Sheets

FIG.3A
あいうえおかき
さしすせそたち
なにぬねのはひ
まみむめも
FIG.3B
あいうえおかき
さしすせそたち
コード
FIG.3C
あいうえおかき
さしすせそたち
コード
　　　　[432]
FIG.3D
あいうえおかき
さしすせそたち
コード　4321
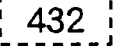叩
FIG.3E
あいうえおかき
さしすせそたち
コード　4321
傍
FIG.3F
あいうえおかき
さしすせそたち
なにぬねのはひ
まみむめ傍

FIG.4A

KUTEN CODE TABLE

| KUTEN CODE | KANJI |
|---|---|
| ☆☆☆☆ | 漢 |
| □□□□ | 傍 |
| ○○○○ | 叩 |

JIS CODE-KUTEN CODE CONVERSION TABLE

| JIS CODE | KUTEN CODE |
|---|---|
| ××××  | □□□□ |
| □□□□ | ○○○○ |

SHIFT JIS CODE-KUTEN CODE CONVERSION TABLE

| SHIFT JIS CODE | KUTEN CODE |
|---|---|
| △△△△ | ☆☆☆☆ |

~22c

CHARACTER INFORMATION PROCESSOR

BACKGROUND OF THE INVENTION

1. Field of the Invention

The present invention relates to a character information processor having a function of directly inputting a character to be inputted. The present invention is applicable to, for example, a tape printing apparatus adapted to print arbitrary character information on a tape.

2. Discussion of the Related Art

A tape printing apparatus, which is one of character printing apparatuses, is designed to facilitate preparation of a label originated by the user which is to be attached on a spine cover of a file or the like.

A conventional tape printing apparatus has a key which is provided on an operation panel and adapted to input characters so that a desired character string can be previously inputted by operating the key.

Also, the conventional tape printing apparatus has a tape feeding mechanism by which a tape can be fed and discharged through a tape discharging outlet.

Further, the conventional tape printing apparatus has a printing mechanism, including a thermal head, and a tape cutting mechanism provided in this order on the path for allowing the tape to be fed.

In the tape printing apparatus, when a print instruction key is operated, control means controls the tape feeding mechanism to feed the tape at a predetermined speed, and controls the tape printing mechanism to print the previously inputted character string on the tape thus fed.

Also, when printing of the character string is completed, the control means further controls the tape feeding mechanism to vacantly feed the tape (i.e., to feed the tape without performing printing on the tape) until a portion of the tape on which printing is completed is entirely positioned outside the tape printing apparatus, then causes the feeding of the tape to be stopped.

After the feeding of the tape is stopped, the tape portion on which the character string is printed is cut off by the tape cutting mechanism which is driven by the user or driven automatically.

Thus, a label originated by the user having thereon a desired character string can be obtained.

Meanwhile, in the tape printing apparatus, when a kanji is included in the label to be prepared, it is common that the reading of the kanji is inputted in the form of hiraganas and then the inputted hiraganas are converted into a kanji. Kanjis and hiraganas are letters which are used in the Japanese language system. Kanjis are ideograms while hiraganas are phonograms. The reading of a kanji can be expressed by means of hiraganas.

If the user cannot input a desired kanji into the apparatus when he does not know the reading of the kanji, the apparatus is inconvenient to the user.

Under the circumstances, it is common that the apparatuses are equipped with a function by which the user can directly input a desired kanji simply by designating a kanji code allocated to the desired kanji. When the user intends to input a kanji "漢", he can accomplish his intention by inputting a Kuten code "2033" serving as the kanji code.

Thus, the function of inputting a kanji by using a kanji code is a very useful when inputting a kanji whose reading is unknown. At present, there coexist many kinds of code systems which offer such kanji codes, including a Kuten code system, a JIS code system, and a Shift JIS code system.

Under the above circumstances, it may happen that the code system to which the user is accustomed does not coincide with the code system which the tape printing apparatus has. In such a case, if he inputs a code under the code system to which he is accustomed, the kanji eventually displayed on the screen may be different from the kanji which the user intends to obtain. In such a case, the user must consult the operation manual of the tape printing apparatus to find out a code allocated to the kanji which the user intends to obtain, and then newly input a correct code.

However, the user who is accustomed to a code system different from that provided in the apparatus may regard such operations as a burdensome and inefficient procedure, so that the user may feel that the usability of the tape printing apparatus is poor.

Further, when the user is not accustomed to handling such operation manuals, it is very difficult for him even to reliably perform such a procedure. If he fails to obtain the desired kanji through conversion of input code, he will be liable to have difficulty in performing the subsequent operations.

SUMMARY OF THE INVENTION

The present invention is accomplished in view of the above-mentioned problems. It is therefore an object of the present invention to provide a character information processor in which any user can input characters by using a code system to which he is accustomed.

To achieve the above object, the present invention provides a character information processor having a function by which the user can obtain a character to be inputted by inputting a code corresponding to the character, the character information processor including: (1) code input means through which the code is inputted; (2) a plurality of code-character conversion tables which are associated with different code systems and each of which contains relationships between codes and their corresponding characters under the code system; (3) eligible character retrieving means for retrieving each of the plurality of code-character conversion tables to find out a character corresponding to the code inputted through the code input means so as to output the character thus found as an eligible character with respect to each of the plurality of code-character conversion tables; (4) display means for displaying, on a display screen, one or more eligible characters supplied from the eligible character retrieving means; and (5) selecting means for selecting one character as a desired character out of the one or more eligible characters thus displayed.

It is preferred that the plurality of code-character conversion tables include: (1) a first table which contains relationships between all the codes and their corresponding characters under a first code system; and (2) a second table which converts only specific codes under a second code system to related codes under the first code system, the specific codes under the second code system being different from the identical codes under the first code system in the relationship between a code and a character.

It is preferred that, if a plurality of eligible characters are obtained, the display means displays the plurality of eligible characters on the same screen.

In the character information processor according to the present invention, when a code is inputted by means of the code inputting means, the eligible character retrieving means retrieves each of the plurality of code-character conversion tables which are associated with different code systems and each of which contains relationships between codes and their corresponding characters under the code system, to find out a character corresponding to the code inputted through the code input means so as to output the character thus found as an eligible character with respect to each of the plurality of code-character conversion tables. As a result, display means displays, on a display screen, one or more eligible characters supplied from the eligible character retrieving means, and the selecting means selects one character as a desired character out of the one or more eligible characters thus displayed.

Owing to this configuration, since the user can have one or more eligible kanjis including the kanji which intends to obtain only by inputting a code on the code system to which he is accustomed, he can complete the converting operation only by selecting one which he intends to obtain out of these displayed eligible kanjis.

It is preferred that the plurality of code-character conversion tables include: (1) a first table which contains relationships between all the codes and their corresponding characters under a first code system; and (2) a second table which converts only specific codes under a second code system to related codes under the first code system, the specific codes under the second code system being different from the identical codes under the first code system in the relationship between a code and a character. The reason for this is that the amount of memory needed for storing the table can be reduced.

Further, it is preferred that when there are a plurality of eligible characters, the plurality of eligible characters are displayed on the same screen. The reason for this is that, when the user selects a character which the user intends to obtain out of the eligible characters, the user can omit such a procedure as selecting a suitable screen.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which:

FIGS. 3A, 3B, 3C, 3D, 3E, and 3F are explanatory views showing the contents shown on the display screen during the code input processing;

FIGS. 4A, 4B, and 4C are explanatory views showing conversion tables; and

DETAILED DESCRIPTION OF THE INVENTION

Hereinafter, a tape printing apparatus as an embodiment of the character information processor according to the present invention will be described with reference to the attached drawings.

(A) Overall Constitution of Electrical Members in the Embodiment

First, the overall constitution of electrical members in a tape printing apparatus as an embodiment of the character information processor according to the present invention will be described with reference to FIG. 2, which is a function block diagram showing the function of each element.

Figure 2:
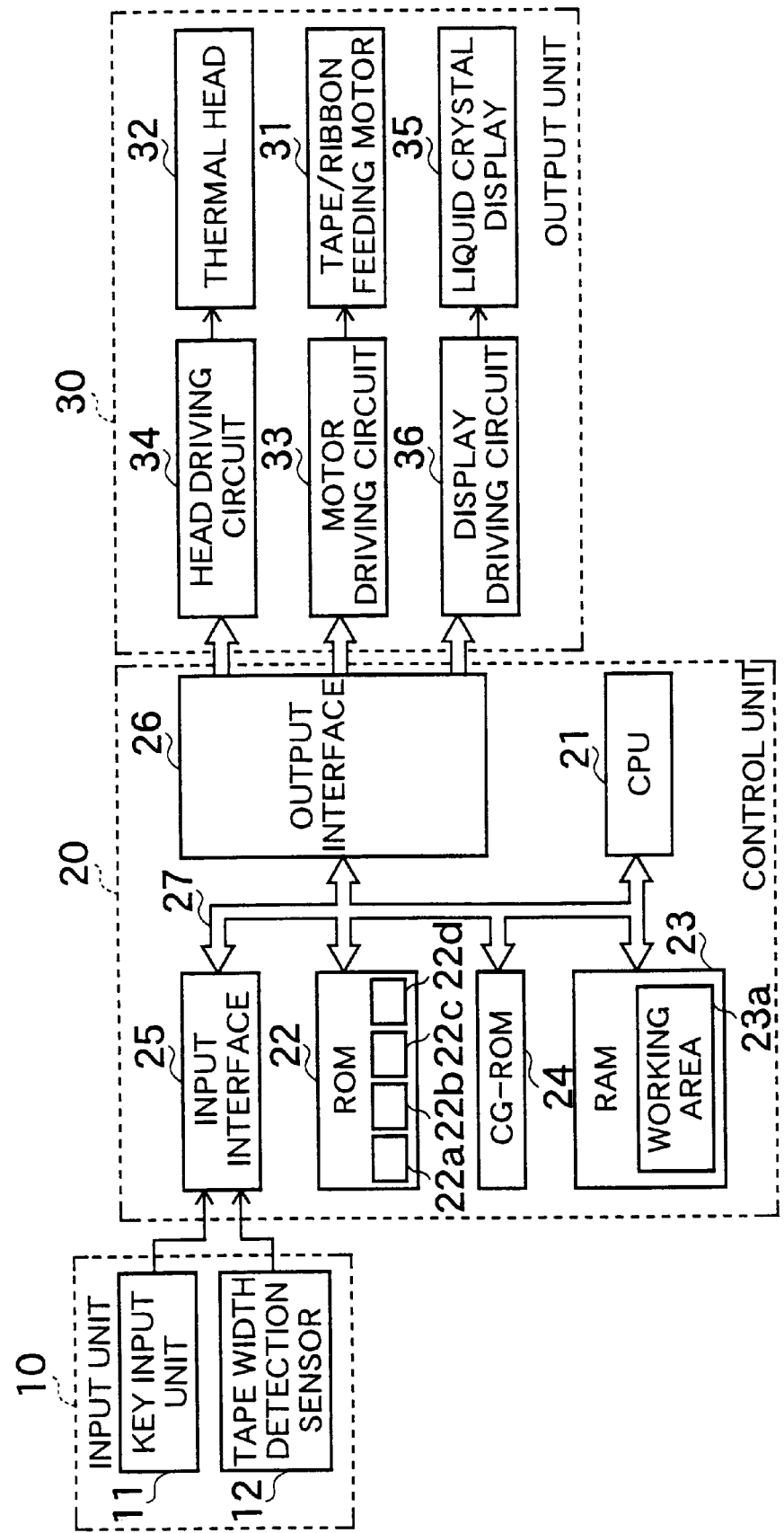
FIG. 2 is a function block diagram showing the overall constitution of the electrical members in the embodiment of the present invention.

As shown in FIG. 2, similarly to the other character printing apparatuses, the tape printing apparatus of this embodiment roughly includes an input unit 10, a control unit 20, and an output unit 30. The control unit 20 is adapted to execute processing in accordance with information supplied from the input unit 10, a processing stage at that time, and so on, and the result of the processing is outputted from the output unit 30 by way of display or print.

The input unit 10, while not detailed, includes a key input unit 11 having a depression key, a dial key and the like, and a tape width detection sensor 12. The key input unit 11 is adapted to generate character code data and various types of control data to be supplied to the control unit 20. The tape width detection sensor 12 is adapted to detect the width of the loaded tape and to supply tape width information to the control unit 20. In actual, detecting the tape width by the sensor 12 is conducted by reading a physical identification element (e.g., a hole) provided on a tape cartridge (which accommodates the tape and an ink ribbon) and representing the width of the tape accommodated in the tape cartridge.

The output unit 30 includes members serving as a print mechanism and members serving as a display mechanism. The output unit 30 includes a tape/ribbon feeding motor 31 and a thermal head 32, both serving as the print mechanism. The tape/ribbon feeding motor 31 is constituted by, for example, a stepping motor and adapted to feed a tape and a ink ribbon loaded in the tape printing apparatus (both not shown) to a predetermined printing position or to the outside of the tape printing apparatus. The thermal head 32 is, for example, fixed and adapted to perform printing on the running tape by the thermal transferring method. The thermal head 32 have a performance of simultaneously printing, for example, 96 dots at its maximum. The tape/ribbon feeding motor 31 is driven by a motor driving circuit 33, and the thermal head 32 is driven by the head driving circuit 34, both driven under the control of the control unit 20.

Cutting of the tape portion on which printing is completed is performed by a cutter (not shown) which is driven by a motor (not shown). Cutting of such a tape portion may be performed by a cutter which is driven by a force applied by the user.

In the case of the tape printing apparatus according to this embodiment, the output unit 30 includes a liquid crystal display 35 as the display mechanism. The liquid crystal display 35 is driven by a display driving circuit 36 under the control of the control unit 20 and adapted to directly display an input character string, various attribute information, and so on. On the display 35, there are displayed a plurality of indicators which are adapted to be lighted, flashing or lighted off to indicate states of the attributes (such as character sizes and input lines) designated by the characters printed at the portions lying on the apparatus body and surrounding the display 35.

The control unit 20 is constituted by, for example, a microcomputer. The control unit 20 includes a CPU 21, a ROM 22, a RAM 23, a character generator ROM (CG-ROM) 24, an input interface 25 and an output interface 26 that are connected via a system bus 27.

The ROM 22 stores various types of processing programs, and fixed data such as dictionary data for kana-kanji conversion. The RAM 23 is used as a working memory and adapted to store fixed data associated with the user input. The RAM 23 is backed up even while the electric power is turned off.

The processing programs and the fixed data stored in the ROM 22, and the fixed data stored in the RAM 23 will be detailed later. The ROM 22 also stores a processing program 22d for code input and three types of conversion tables 22a, 22b and 22c respectively corresponding to different conversion tables. Further, when these programs are executed, a working area 23a for the execution of these programs is appropriately formed in the RAM 23.

The CG-ROM 24 is adapted to store font information of letters provided in the tape printing apparatus, and to output, when code data for specifying a letter are supplied, font information corresponding thereto. The font information stored in the CG-ROM 24 may be either of outline font and bitmap font. Alternatively, the CG-ROM 24 may store font information for display purposes and font information for print purposes, the former and latter font information being different from each other.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, by appropriately using fixed data stored in the ROM 22 or RAM 23. Also, the CPU 21 is adapted to cause the liquid crystal display 35 to display the state or result of the processing and so on, or to cause the state or result of the processing to be printed on a tape (not shown).

(B) Code Input Processing in the Embodiment

The tape printing apparatus according to the present embodiment is characterized in that a part of operations performed during code input processing in the tape printing apparatus according to the present embodiment are different from those in conventional printing apparatuses.

Therefore, in the following description, the operations of the tape printing apparatus according to the present embodiment will be described on the assumption that the user designates the code input mode by using the key input unit 11.

Figure 1:
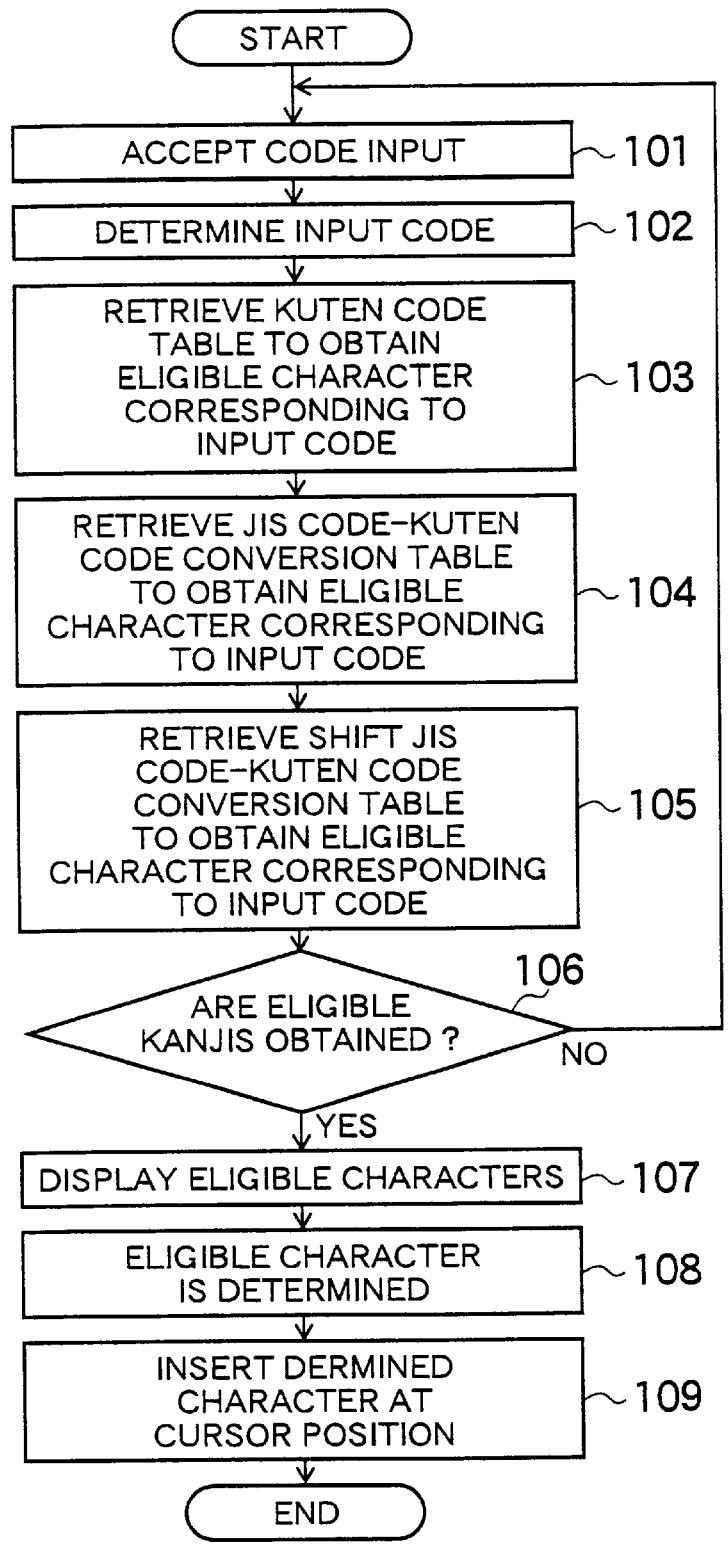
FIG. 1 is a flowchart showing operations at code input processing.

FIG. 1 is a flowchart showing the flow of the processing of the program for code input stored in the ROM 22. When code input is designated by operating the key input unit 11, the CPU 21 executes the program for code input.

The CPU 21 first switches the lower part of the display screen of the liquid crystal display 35 to a screen for allowing the user to perform code input (hereinafter often referred to "code input screen"), as shown in FIG. 3B (step 101).

It should be noted that, from this point on, characters or symbols other than the numeric characters 0 to 9 and the alphabetical characters A, B, C, D, E and F will not be accepted. Accordingly, if the user operates the keys to input characters or symbols other than the numeric characters 0 to 9 and the alphabetical characters A, B, C, D, E and F, such input is rejected or a warning is given when the keys are operated. It should be noted that each of the numeric characters 0 to 9 and the alphabetical characters A, B, C, D, E and F serves as a hexadecimal digit for code input.

FIG. 3C shows the state of the display screen at the time when input of the three digits of the code of four digits is completed, that is, when the numeric characters "4", "3", and "2" have been inputted, under the above-mentioned rule.

When input of all the four numeric or alphabetical characters constituting the code of four digits is completed as shown in FIG. 3D, the CPU 21 automatically determines the four numeric or alphabetical characters as an input code (step 102).

In this embodiment, the input code of four digits is automatically determined immediately after the numeric or alphabetical character of the fourth digit is inputted. However, the input code of four digits may be determined on the condition that a predetermined determining operation is performed after the numeric or alphabetical character of the fourth digit is inputted. It is needless to say that, in this case, the input code can be corrected arbitrarily until the input code is determined.

After completing the determination of the input code (in the case of FIG. 3D, "4321"), the CPU 21 proceeds to the processing of retrieving each of the three kinds of conversion tables stored in the ROM 22, i.e., the conversion tables 22a, 22b and 22c, to find out a code coinciding with the input code so as to obtain an eligible kanji corresponding to the input code (steps 103 to 105).

It should be noted that in the following description, each of the codes under the Kuten code system will be often referred to as "Kuten code", each of the codes under the JIS code system will be often referred to as "JIS code", and each of the codes under the Shift JIS code system will be often referred to as "Shift JIS code".

Firstly, at step 103, the CPU 21 performs retrieval with respect to the Kuten code system. Specifically, the CPU 21 retrieves the Kuten code table (conversion table 22a) shown in FIG. 4A to find out a Kuten code coinciding with the input code so as to obtain a kanji corresponding to the input code. It should be noted that the Kuten code table (conversion table 22a) contains the relationships between all the Kuten codes and their corresponding kanjis.

As a result of the retrieval with respect to the Kuten code table (conversion table 22a), a Kuten code coinciding with the input code "4321" is found in the Kuten code table (conversion table 22a), and the Kuten code corresponds to a kanji "俸", and accordingly the kanji "俸" is kept as an eligible kanji in the case where the input code is assumed to be a Kuten code.

After completing the retrieval associated with the Kuten code system, the CPU 21 proceeds to the next step 104.

At step 104, the CPU 21 retrieves a JIS code-Kuten code conversion table (conversion table 22b) shown in FIG. 4B to find out a JIS code coinciding with the input code so as to obtain a kanji corresponding to the input code.

Here, the JIS code-Kuten code conversion table (conversion table 22b) is provided for simplifying the retrieval with respect to the JIS code system to obtain a kanji corresponding to the input code. The JIS code-Kuten code conversion table (conversion table 22b) is obtained by comparing the JIS codes with the Kuten codes; extracting JIS codes and Kuten codes which are the same but correspond to different kanjis; and arranging, in the form of a table, such JIS codes and Kuten codes to form relations therebetween. Forming relations between such JIS codes and Kuten code in obtaining the JIS code-Kuten code conversion table (conversion table 22b) is performed in such a manner that a JIS code and a Kuten code which differ from each other but correspond to the same kanji are related to each other and arranged in the form of a table.

After retrieving the JIS code-Kuten code conversion table (conversion table 22b), when no JIS code coinciding with the input code is found, this means that the JIS code (coinciding with the input code) and the Kuten code identical with the JIS code correspond to the same kanji.

Therefore, when no JIS code coinciding with the input code is found in the JIS code-Kuten code conversion table (conversion table 22b), the CPU 21 retrieves the Kuten code table (conversion table 22a) to find out a Kuten code coinciding with the input code, and the kanji corresponding to the Kuten code is kept as an eligible kanji in the case where the input code is assumed to be a JIS code.

In contrast, when a JIS code coinciding with the input code is found in the JIS code-Kuten code conversion table (conversion table 22b), this means that the JIS code and the Kuten code identical with the JIS code correspond to different kanjis. Therefore, when a JIS code coinciding with the input code is found in the JIS code-Kuten code conversion table (conversion table 22b), the CPU 21 converts the JIS code to the corresponding Kuten code in accordance with the JIS code-Kuten code conversion table (conversion table 22b). Then, the CPU 21 retrieves the Kuten code table (conversion table 22a) to find out the Kuten code so as to obtain a kanji corresponding to the Kuten code. The kanji thus obtained is kept as an eligible kanji in the case where the input code is assumed to be a JIS code.

In this embodiment, since a JIS code coinciding with the input code is found in the JIS code-Kuten code conversion table (conversion table 22b), the JIS code is converted to a corresponding Kuten code. Since the Kuten code thus obtained corresponds to a kanji "邵", the kanji "邵" is kept as an eligible kanji in the case where the input code is assumed to be a JIS code.

After completing the retrieval associated with the JIS code system, the CPU 21 proceeds to the next step 105.

At step 105, the CPU 21 retrieves a Shift JIS code-Kuten code conversion table (conversion table 22c) shown in FIG. 4C to find out a Shift JIS code coinciding with the input code so as to obtain a kanji corresponding to the input code.

Here, the Shift JIS code-Kuten code conversion table (conversion table 22c) is provided for simplifying the retrieval with respect to the Shift JIS code system to obtain a kanji corresponding to the input code. The Shift JIS code-Kuten code conversion table (conversion table 22c) is obtained by comparing the Shift JIS codes with the Kuten codes; extracting Shift JIS codes and Kuten codes which are the same but correspond to different kanjis; and arranging, in the form of a table, such Shift JIS codes and Kuten codes to form relations therebetween. Forming relations between such Shift JIS codes and Kuten codes in obtaining the Shift JIS code-Kuten code conversion table (conversion table 22c) is performed in such a manner that a Shift JIS code and a Kuten code which differ from each other but correspond to the same kanji are related to each other and arranged in the form of a table.

After retrieving the Shift JIS code-Kuten code conversion table (conversion table 22c), when no Shift JIS code coinciding with the input code is found, this means that the Shift JIS code (coinciding with the input code) and the Kuten code identical with the Shift JIS code correspond to the same kanji.

Therefore, when no Shift JIS code coinciding with the input code is found in the Shift JIS code-Kuten code conversion table (conversion table 22c), the CPU 21 retrieves the Kuten code table (conversion table 22a) to find out a Kuten code coinciding with the input code, and the kanji corresponding to the Kuten code is kept as an eligible kanji in the case where the input code is assumed to be a Shift JIS code.

In contrast, when a Shift JIS code coinciding with the input code is found in the Shift JIS code-Kuten code conversion table (conversion table 22c), this means that the Shift JIS code and the Kuten code identical with the Shift JIS code correspond to different kanjis. Therefore, when a Shift JIS code coinciding with the input code is found in the Shift JIS code-Kuten code conversion table (conversion table 22c), the CPU 21 converts the Shift JIS code to the corresponding Kuten code in accordance with the Shift JIS code-Kuten code conversion table (conversion table 22c).

Then, the CPU 21 retrieves the Kuten code table (conversion table 22a) to find out the Kuten code so as to obtain a kanji corresponding to the Kuten code. The kanji thus obtained is kept as an eligible kanji in the case where the input code is assumed to be a Shift JIS code.

In this embodiment, since no corresponding kanji is found, no eligible kanji is kept.

After completing the retrieval associated with the Shift JIS code system, the CPU 21 proceeds to the next step 106.

At step 106, it is judged whether or not one or more eligible kanjis corresponding to the input code are obtained as a result of the retrievals with respect to the three kinds of conversion tables 22a, 22b and 22c.

When a negative result is obtained at step 106, that is, when it is judged at step 106 that no eligible kanji is found, a warning (e.g., a notice given by way of an alarm sound) is given, the currently displayed input code is deleted, and then the code input screen as shown in FIG. 3B is restored.

On the other hand, when a positive result is obtained in step 106, that is, when it is judged at step 106 that one or more eligible kanjis are found, the CPU 21 causes the eligible kanjis to be displayed as shown in FIG. 3D (step 107).

In this case, when an eligible kanji is obtained with respect to each of the Kuten code system, the JIS code system and the Shift JIS code system, all the three eligible kanjis are displayed on the same display screen in such a manner as to be aligned at the lower portion thereof.

The eligible kanjis are displayed in the order of that associated with the Kuten code system, that associated with the JIS code system, and that associated with the Shift JIS code system.

When only two eligible kanjis are obtained, the two eligible kanjis are displayed on the display screen. In this case, the eligible kanjis are displayed close to each other without providing any space therebetween. That is, the space for the code system having no associated eligible kanji is occupied by the eligible kanji associated with the subsequent code system.

In the case of FIG. 3D, two eligible kanjis "傍" and "邵" are obtained as a result of the retrievals with respect to the input code "4321", and displayed as shown in the drawing.

When the plurality of eligible kanjis are displayed, the user selects one of the displayed eligible kanjis. Thus, by conducting such a simple operation of selecting one of the displayed eligible kanji, the user can complete the operation of converting the input code to the desired kanji. In the above-described manner, he can obtain a kanji through the code system to which he is accustomed.

For example, if the desired kanji is "傍", the user can complete the converting operation by a simple operation of selecting and determining the kanji "傍" while the cursor is placed on the kanji "傍", as shown in FIG. 3D.

Instead, if the desired kanji is not "傍" but "邵", the user has only to shift the cursor to place it on the kanji "邵", the user can complete the converting operation by a simple operation of selecting and determining the kanji "邵".

In any event, when one of the eligible kanjis is selected and the converting operation is determined (step 108), the eligible kanji thus determined (in this case, "傍") is inserted at the cursor position at the time when the code input mode is initiated (step 109), and then the code input mode is completed.

It should be noted that, when the code input mode is selected again by the user after the code input mode is completed, the steps 101 to 109 are repeatedly performed.

(C)Advantages of the Embodiment

As described above, according to the present embodiment, the user can obtain a plurality of (or one) eligible kanjis by inputting a code in a code system to which the user is accustomed, and can complete the operation of converting the input code to the desired kanji only by a simple operation of selecting one of the plurality of kanjis thus obtained. Owing to this configuration, the work efficiency in the apparatus is markedly enhanced compared with conventional apparatuses.

Further, this configuration contributes to reducing the burden of the users who are not accustomed to code input. Specifically, unlike those who usually use electronic equipment such as computers, most of the users of tape printing apparatuses are not accustomed to code input. Therefore, they are liable to think that they can obtain a desired kanji through the code system to which they are accustomed even when they use the apparatus which has a code system different from the code system to which they are accustomed. Under the circumstances, this configuration can remarkably save such users of the tape printing apparatus their labor and time.

Further, it is needless to say that this configuration also contributes to enhancing the usability of the apparatus for those who are accustomed to handing electronic equipment such as computers and to code input. The reason for this is that it is not necessary for the user to review or re-memorize the code systems provided in the respective apparatuses and he can input a desired kanji through the code system to which he is accustomed.

(D) Other embodiments

Although the preferred embodiments of the present invention have been described above, it should be understood that the present invention is not limited thereto and that other modifications will be apparent to those skilled in the art without departing form the spirit of the invention.

(1) In the above-mentioned embodiment, as the input code system, the three kinds of code systems, that is, the Kuten code, the JIS code system and the Shift JIS code system are employed, but the present invention is not limited thereto. The present invention can be applied, for example, to printing apparatuses in which the UNIX code system, the ASCII code system or the like is employed as the input code system.

(2) Further, in the above-mentioned embodiment, the three kinds of conversion tables are prepared in the ROM 22, but the present invention is not limited thereto. For example, the present invention can be applied to an apparatus in which two kinds of conversion tables are prepared, or an apparatus in which four or more kinds of conversion tables are prepared.

(3) In the above-mentioned embodiment, with respect to only the Kuten code system, there is provided a conversion table which contains the relationships between all the Kuten codes and their corresponding kanjis, while with respect to the JIS and Shift JIS code systems, there is provided a conversion table which contains the relationships between only the specific JIS or Shift JIS codes and the Kuten codes which are identical but correspond to different kanjis, but the present invention is not limited thereto. For example, with respect to the respective code systems, there may be provided a table which contains all the codes and their corresponding Kanjis.

(4) In the above-mentioned embodiment, the characters to be inputted through code input are limited to kanjis. However, characters other than kanjis or symbols, such as hiraganas, katakanas, numeric characters, alphabets and the like, may be included in the objects of code input.

FIGS. 5A to 5F show an example of code input of such characters. FIGS. 5A to 5F show a state in which the symbol "¥" is inserted in the beginning position of the third line (i.e., at the position before "300").

Figure 5A:
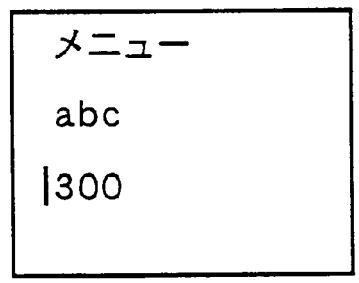
FIGS. 5A, 5B, 5C, 5D, 5E, and 5F are explanatory views showing the contents shown on the display screen according to the modification.
Figure 5B:
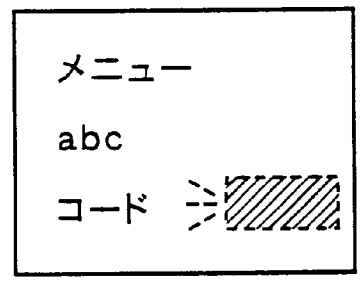
Figure 5C:
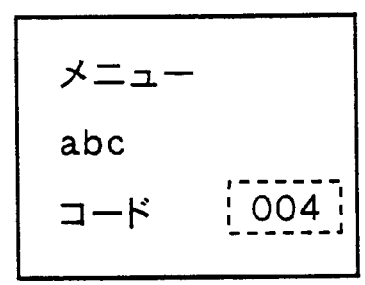
Figure 5D:
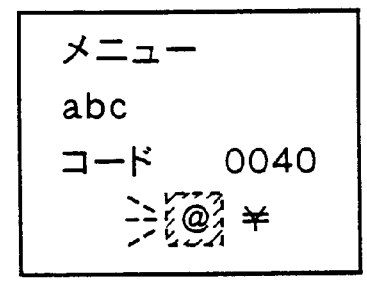

First, the cursor is shifted to the position of the numeric character "3" (FIG. 5A), and then code input is designated. When the code input is designated, the lower portion of the display screen is switched to the code input screen (FIG. 5B). Thereafter, a code "0040" is inputted (FIGS. 5C and 5D). Then, the CPU 21 retrieves each of the conversion tables stored in the ROM 22 to find out a code coinciding with the input code, and then displays the results of the retrievals.

Figure 5E:
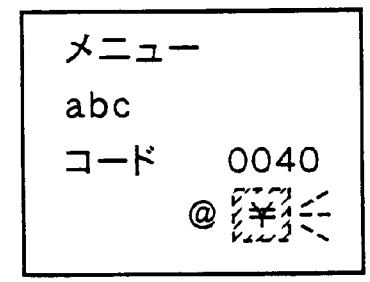
Figure 5F:
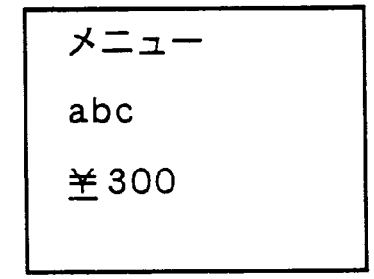

In this case, it is assumed that symbols "@" and "¥" are displayed as the results of the retrievals (FIGS. 5D and 5E). In this state, when the symbol "¥" is determined as the input character, a character string "¥300" is displayed, as shown in FIG. 5F.

(5) Further, in the above-mentioned embodiment, when a code input mode is selected, both of accepted input codes and eligible kanjis are displayed at the lower portion of the display screen of the liquid crystal display 35 in such a manner that all the eligible kanjis are aligned at one time, but the present invention is not limited thereto. The other display positions and the other display methods can be employed.

Specifically, as the display position, the entire display screen, or a portion other than the lower portion of the display screen can be chosen. As to the display method, the apparatus may be configured in such a manner that one of the eligible kanjis is displayed together with the number of the remaining eligible kanjis and thereafter the eligible kanjis are subsequently displayed one by one in accordance with user's operations.

(6) Further, in the above-mentioned embodiment, the three kinds of conversion tables 22a, 22b and 22c are stored in the ROM 22, but the present invention is not limited thereto. For example, the conversion tables may be stored in the RAM 23 or another recording medium. Further, the conversion tables may be separately stored in different recording mediums.

(7) Further, although in the above-mentioned embodiment, the code inputting function of the character information processor of the present invention is described by employing a tape printing apparatus as an example, the present invention can be applied to character information processors such as word processors or computers.

Further, the present invention can be applied to character information processors having a communication function such as portable remote terminals.

(E) Embodiment for Reference

Further, the above-mentioned plurality of code-character conversion tables may be replaced by one code-character conversion table which contains all the kanjis corresponding to the respective codes of the plurality of code systems. It should be noted that in this embodiment steps 103 to 105 shown in the flowchart in FIG. 1 are replaced by one step because the retrievals conducted with respect to each code system can be replaced by one-time retrieval.

(F) Advantages of the Invention

As described above, according to the present invention, since there are provided: code input means through which the code is inputted; a plurality of code-character conversion tables which are associated with different code systems and each of which contains relationships between codes and their corresponding characters under the code system; eligible character retrieving means for retrieving each of the plurality of code-character conversion tables to find out a character corresponding to the code inputted through said code input means so as to output the character thus found as an eligible character with respect to each of the plurality of code-character conversion tables; display means for displaying, on a display screen, one or more eligible characters supplied from the eligible character retrieving means; and selecting means for selecting one character as a desired character out of the one or more eligible characters thus displayed. This configuration realizes a character information processor in which the user can convert the input code to a desired kanji by a simple operation of inputting a code under the code system to which he is accustomed.

It should be noted that, since the present invention is not limited to the above-described embodiments and modifications, the present invention is to be determined solely by the appended claims.

What is claimed is:

1. A character information processor having a function by which the user can obtain a character to be input by inputting a code corresponding to the character, said character information processor comprising:

code input means through which the code is input;

a plurality of code-character conversion tables which are associated with different code systems wherein one or more codes correspond to different characters in the respective code systems and one or more characters are each identified by different codes in the respective code systems;

eligible character retrieving means for retrieving each of the plurality of code-character conversion tables to find different characters corresponding to the code input through said code input means so as to output the different characters thus found as eligible characters identified by the respective plurality of code-character conversion tables;

display means for displaying, on a display screen, the eligible characters supplied from the eligible character retrieving means; and selecting means for selecting one character as a desired character out of the eligible characters thus displayed.

2. The character information processor according to claim 1, wherein said plurality of code-character conversion tables include:

a first table which contains relationships between all the codes and their corresponding characters under a first code system; and a second table which converts only specific codes identifying first characters under a second code system to different codes identifying the same first characters under the first code system, the specific codes under the second code system identifying characters different from characters identified by the identical codes under the first code system.

3. The character information processor according to claim 1, wherein when a plurality of eligible characters are obtained, said display means displays the plurality of eligible characters on the same screen for selection by the selection means.

* * * * *